July 29, 1924.
T. B. MURRAY
1,503,331
CLUTCH AND FLYWHEEL COMBINATION FOR MOTOR VEHICLE ENGINES
Filed Sept. 20, 1923
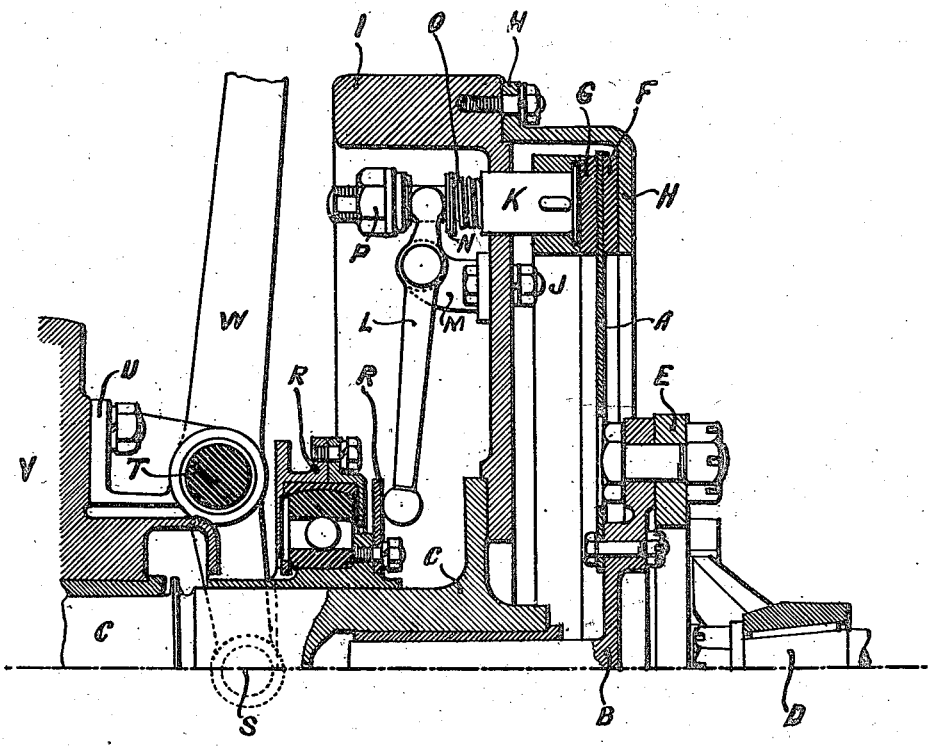
INVENTOR:-
THOMAS BLACKWOOD MURRAY
by his Attorneys
Howson and Howson Patented July 29, 1924.

1,503,331

UNITED STATES PATENT OFFICE.

THOMAS BLACKWOOD MURRAY, OF LIPHOOK, ENGLAND.

CLUTCH AND FLYWHEEL COMBINATION FOR MOTOR-VEHICLE ENGINES.

Application filed September 20, 1923. Serial No. 663,813.

*To all whom it may concern:*

Be it known that I, THOMAS BLACKWOOD MURRAY, a subject of the King of Great Britain and Ireland, and a resident of Liphook, Hampshire, England, have invented certain new and useful Clutch and Flywheel Combinations for Motor-Vehicle Engines, of which the following is the specification.

The invention relates to internal combustion engines for motor vehicles and the combination with their flywheels of clutch and clutch-operating mechanism in suchwise as to afford certain structural advantages and certain facilities in the design and construction of flexible joints and other elements behind the clutch.

According to the invention the clutch-operating muff or equivalent device (which may be of any convenient form) is located on the crank shaft (which may be extended to accomodate it) between the flywheel and the adjacent end of the engine casing, while the usual cross-shaft, which is operatively connected to the clutch pedal and from which the clutch muff is operated, is supported entirely or partially in bearings formed on or fixed to the engine casing or the rear engine bearers, or both. In order to permit of the assembly of the muff and its parts on the crank shaft, the flywheel may be mounted and keyed upon the taper end of the shaft, or may be secured thereon in other convenient manner, permitting of the passage of the muff. Alternatively, the muff in its entirety or certain members thereof may be split longitudinally so that it may be assembled on the shaft without the necessity for disturbing the flywheel.

The muff device and its allied parts may be applied for the operation of any usual type of friction clutch. Very conveniently the muff may be connected to the member of the clutch which it operates by levers and push rods or like devices parallel with the axis of the shaft and passing through the web or hub of the flywheel.

When the device is applied to a clutch of the type in which the driven member is a disc and the driving members consist jointly of a face on the flywheel and an annular disc carried thereby between which the driven disc is gripped, the annular disc is operated for disengagement by push-rods carried by the flywheel near its periphery and which are engaged by levers pivoted near the periphery of the flywheel and extending radially inwards to be engaged by the muff.

An example of the carrying out of the invention is shown in half sectional elevation in an accompanying sheet of drawings.

In this example the clutch is of the disc type and consists of a thin steel disc A supported on a spider B spigoted into the engine crank-shaft C and connected to a coaxial shaft D—the primary gear-box shaft or an extension thereof—by a usual flexible ring coupling E. Near its periphery this disc is engaged between friction rings F, G the one (F) carried in a casing H from the flywheel I, the other (G) carried on a bearer ring J upon plungers K passing through and carried in the web of the flywheel I. The ring G is urged towards the ring F for engagement of the disc A by springs (not shown) as usual and the withdrawal mechanism—which is the subject of the invention—is applied to the projecting ends of the plungers K. This withdrawal mechanism consists of a series of levers L each pivoted in a bracket M bolted to the flywheel web and engaging at its outer and shorter end between an "anti-rattle" washer N loaded by a spring O and an adjustable serrated washer and nut device P screwed on the plunger K.

At the end of its inner and longer arm, each lever L is engaged by the face of a muff R, which may very conveniently be equipped with a ball bearing, sliding freely on the crank-shaft C of the engine and engaged in turn on its opposite face by stirrup levers S on a shaft T mounted in brackets U on the engine casing V and upon which shaft is mounted also the usual pedal W.

What I claim is:

1. A clutch and engine crank shaft and flywheel combination comprising a flywheel, a clutch carried thereby, a clutch operating muff located on the crank shaft between the flywheel and the engine casing, a clutch pedal cross-shaft, brackets on the engine casing carrying the shaft, stirrup levers on the shaft and operating the muff, levers pivoted on the flywheel and engaged at their inner ends by the muff, and operative connections between the outer ends of these levers and the clutch.

2. A clutch and engine crank shaft and flywheel combination comprising a flywheel, a clutch carried thereby, a clutch operating muff located on the crank shaft between the flywheel and the engine casing, a clutch-pedal cross-shaft, brackets on the engine casing carrying the shaft, stirrup levers on the shaft and operating the muff, levers pivoted on the flywheel and engaged at their inner ends by the muff, plungers passing through and carried in the web of the flywheel, a ring carried by the plungers and engaging a disc on the flywheel, the plungers being engaged by the outer ends of the levers.

In testimony whereof I have signed my name to this specification.

T. BLACKWOOD MURRAY.